United States Patent

[11] 3,586,774

[72] Inventors Frans Brouwer
Glencoe;
Frank L. Sobchak, Chicago, both of, Ill.

[21] Appl. No. 739,745
[22] Filed June 25, 1968
[45] Patented June 22, 1971
[73] Assignee Stewart-Warner Corporation
Chicago, Ill.

[54] FACSIMILE OPTICAL SCANNER ASSEMBLY
14 Claims, 7 Drawing Figs.

[52] U.S. Cl. .......... 178/7.6, 178/DIG. 27, 346/139 A
[51] Int. Cl. .......... H04n 1/14
[50] Field of Search .......... 178/7.1 E, 7.6; 346/139 A

[56] References Cited
UNITED STATES PATENTS

| | | | |
|---|---|---|---|
| 2,464,970 | 3/1949 | Finch | 178/7.6 |
| 2,792,448 | 5/1957 | Deuth | 178/7.6 |
| 2,853,358 | 9/1958 | BeDell | 346/139 A |
| 2,989,586 | 6/1961 | Beck | 178/7.1 E |
| 3,266,047 | 8/1966 | Zabriskie | 346/139 A |
| 3,363,261 | 1/1968 | Maiershofer | 346/139 A |
| 2,643,174 | 6/1953 | Coolem | 346/139 A |

*Primary Examiner*—Robert L. Griffin
*Assistant Examiner*—Joseph A. Orsino, Jr.
*Attorneys*—Augustus G. Douvas, William J. Newman and Norton Lesser

ABSTRACT: A timing belt assembly trained about drive and idler pulley assemblies for supporting optical scanner units and moving the same in a continuous closed path upon rotation of the drive pulley assembly. The effective circumference of the drive pulley assembly is slightly greater than one-third the effective circumference of the timing belt assembly; the effective circumference of the idler pulley assembly is slightly less than one-third the effective circumference of the timing belt assembly; biasing means impose a lateral force on the timing belt assembly for maintaining the latter under substantially constant tension; and the cylindrical face means of the idler pulley assembly, about which the timing belt assembly, comprised of endless flexible tape means, is trained, has an axial extent at least equal to the width of the tape means.

Inventors:-
Frans Brouwer,
Frank L. Sobchak,
By William J. Newman Atty.

FACSIMILE OPTICAL SCANNER ASSEMBLY

BACKGROUND OF THE INVENTION

1. Field of the Invention

The present invention pertains generally to facsimile apparatus for use in wire transmission of graphic data, and more particularly to an improved optical scanner assembly for use in such apparatus.

2. Description of the prior Art

In a typical optical facsimile system, elemental areas of copy material are successively scanned in a transmitter, and images from the scanned material are converted by an optical system into electrical signals for transmission to a receiver. At the receiver, electrical signals from the transmitter are converted to printing current and passed through associated printer contact means and a linear printer bar to produce on intervening moist electrolytic recording paper an image of the transmitted copy.

One type of facsimile apparatus adapted for use as a transmitter or receiver is disclosed and claimed in the copending application of Frans Brouwer and Frank L. Sobchak, Ser. No. 613,545, filed Feb. 2, 1967 now U.S. Pat. No. 3,527,882. This apparatus embodies an optical scanner assembly comprised of drive and idler pulley assemblies, a timing belt assembly trained about the pulley assemblies, and three combined optical scanner and printer contact units, each including an optical scanner and printer contact means, mounted on the timing belt assembly for movement therewith in a continuous closed path. The timing belt assembly includes endless flexible steel tape means engageable about cylindrical face means of the pulley assemblies, and a plurality of tooth elements meshing with tooth recesses in the drive pulley assembly. For timed sequential operation of the three scanner and printer units, the nominal effective circumference of each of the pulley assemblies in one-third the effective circumference of the timing belt assembly. In the transmission mode of operation, the optical scanners are moved successively across copy material to be scanned, while in the receiving mode, the printer contact means are moved successively across recording paper lengthwise of the printer bar.

One problem experienced with the aforesaid optical scanner assembly has been the too frequent breakage of the timing belt tape means. In this respect, interference tends to occur during entry of the tooth elements of the belt assembly into the tooth recesses of the drive pulley assembly resulting in abnormal stress of the tape means. Additionally, expansion of the supporting frame means relative to the tape means, due to different coefficients of expansion, places the tape means under excessive tension which aggravates the interference occurring during tooth engagement at the drive pulley assembly. These factors contribute to eventual breakage of the tape means in a transverse direction. Still further, the cylindrical face means of the idler pulley assembly, which extends axially only one-half the width of the tape means, permits splitting or breakage of the tape means in a longitudinal direction, particularly when the tape means is under excessive tension.

SUMMARY OF THE INVENTION

The present invention is concerned with an improved optical scanner assembly for facsimile apparatus of the general type described above. More particularly, to reduce adverse interference between the tooth elements of the belt assembly and the tooth recesses of the drive pulley assembly during meshing engagement thereof, a slightly oversize drive pulley assembly is employed—that is, the effective circumference of the drive pulley assembly is slightly greater than one-third the effective circumference of the timing belt assembly. Also, to prevent excessive tension in the tape means, a lateral force is imposed by biasing means on the timing belt assembly for maintaining the latter under substantially constant tension while accommodating expansion of the frame means relative to the timing belt assembly. In addition, to minimize splitting of the tape means in a longitudinal direction, the idler pulley assembly is provided with cylindrical face means having an axial extent at least equal to the width of the tape means. The cylindrical idler pulley face means is formed with tooth recesses to accommodate the tooth elements of the belt assembly, and a slightly undersize idler pulley assembly is employed to minimize interference between the tooth elements and the idler pulley tooth recesses during interengagement thereof. The foregoing improvements effectively eliminate breakage of the tape means during operation of the optical scanner assembly.

DESCRIPTION OF THE PREFERRED EMBODIMENT

Figure 1:
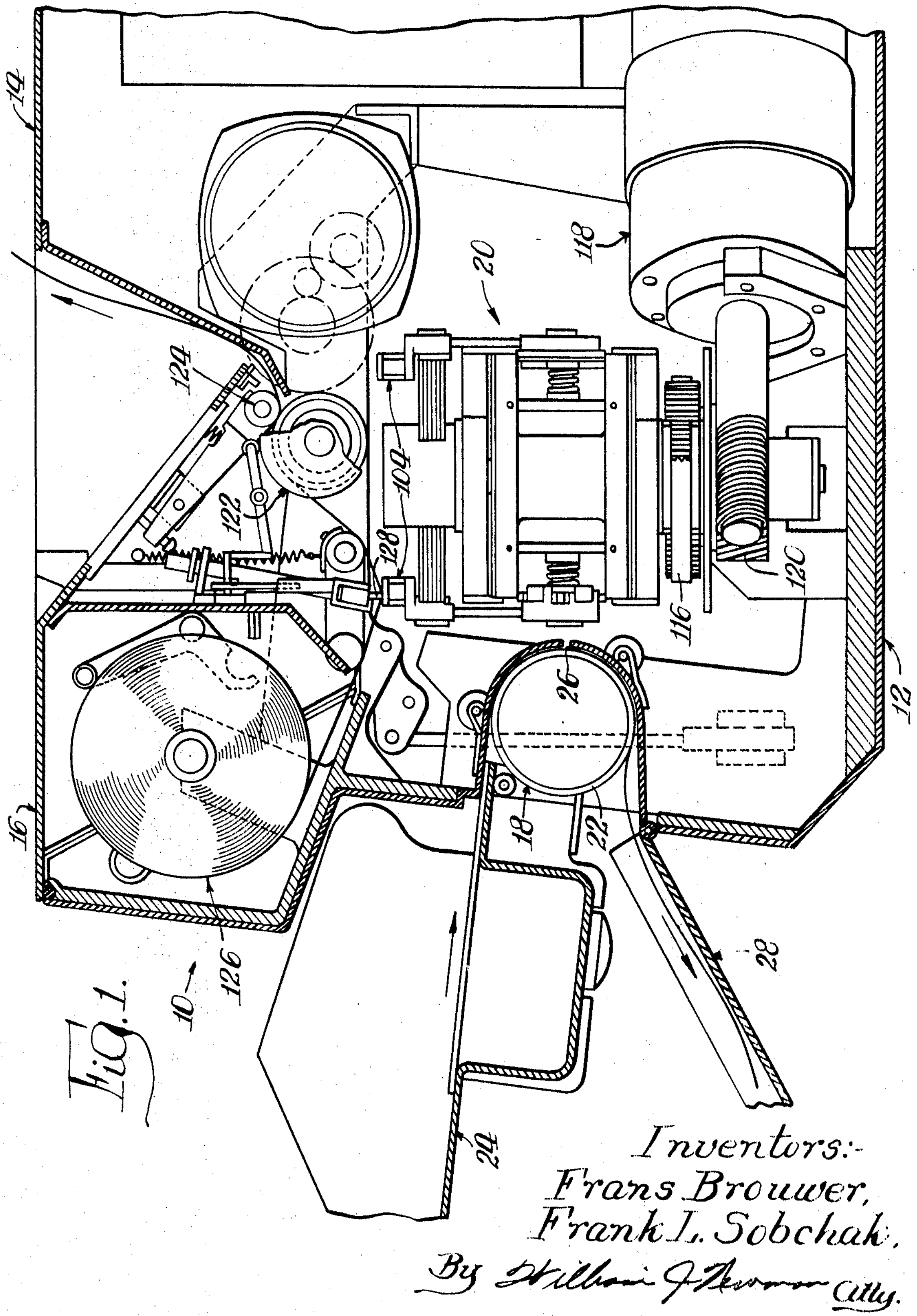
FIG. 1 is a view, partly in section and partly in elevation, of the front portion of a facsimile transceiver incorporating the principles of the present invention.

Referring now to FIG. 1, there is indicated generally by the reference numeral 10 one type of facsimile apparatus—a facsimile transceiver—in which the optical scanner assembly of the present invention may be incorporated. The facsimile transceiver 10 comprises a main frame 12 enclosed by a cover assembly 14 and a top door assembly 16.

Operable in the transmission mode of the facsimile transceiver 10 are a copy feed mechanism indicated at 18 and a scanner assembly indicated generally at 20. The copy feed mechanism includes a transverse power-driven copy feed roller 22 which draws copy material from a copy feed tray 24, feeds the copy material past a longitudinal scanning slot 26, and discharges the same onto a tray 28. The scanner assembly 20 extends parallel to the copy feed roller 22, and, as shown in FIG. 2, includes frame means comprised of a main frame 30 and a yoke member 31, drive and idler pulley assemblies 32 and 34, a timing belt assembly 36 trained about the pulley assemblies 32 and 34, a timing belt assembly 36 trained about the pulley assemblies 32 and 34, combined optical scanner and printer contact units 38 carried by the timing belt assembly 36, and associated synchronizing and electrical transmission means.

Figures 2, 5, 6, 7:
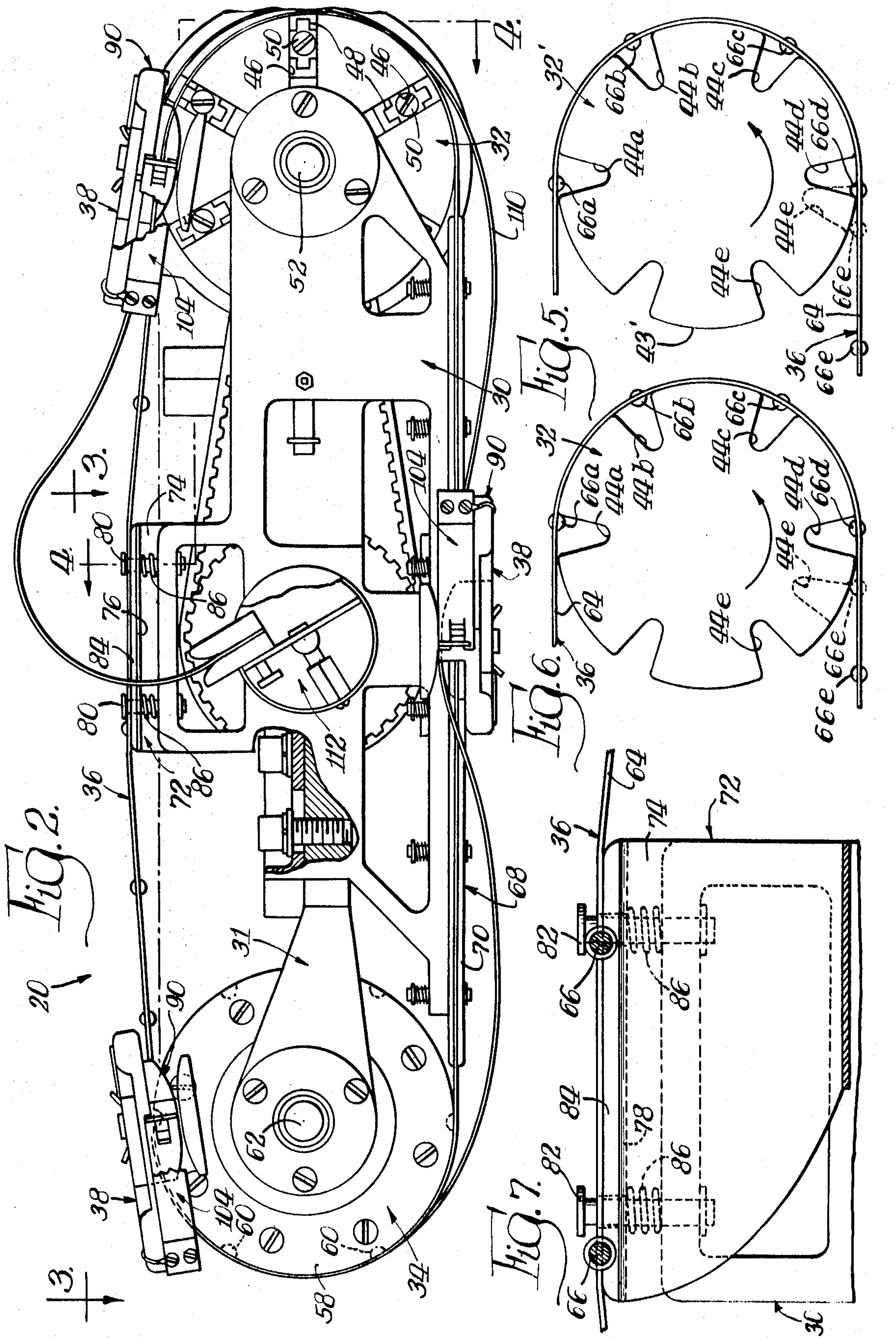
FIG. 2 is a plan view, on an enlarged scale and with certain portions broken away, of the optical scanner assembly of the facsimile transceiver of FIG. 1.
FIG. 5 is a schematic view of one end of an optical scanner assembly with an undersize drive pulley assembly.
FIG. 6 is a schematic view of one end of an optical scanner assembly with an oversize drive pulley assembly in accordance with the principles of the present invention.
FIG. 7 is a horizontal sectional view, on a further enlarged scale, taken substantially along the line 7–7 in FIG. 4, looking in the direction indicated by the arrows.
Figures 3, 4:
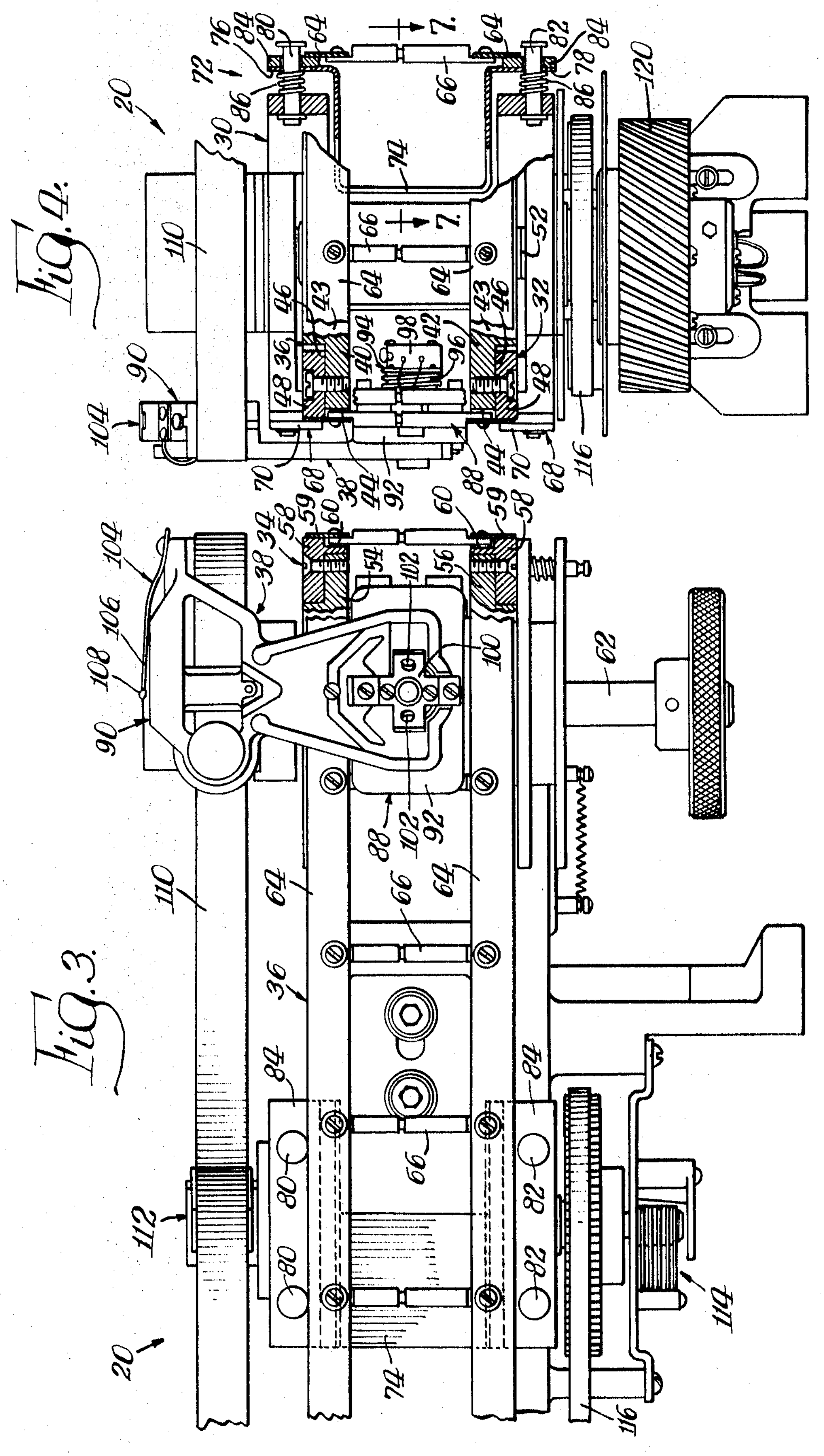
FIG. 3 is a partial side elevational view, with portions broken away of the optical scanner assembly of FIG. 2, taken generally along the line indicated by the arrows 3–3 in FIG. 2.
FIG. 4 is a view, partly in section and partly in elevation, taken substantially along the line 4–4 in FIG. 2, looking in the direction indicated by the arrows.

As shown in FIGS. 2 and 4, the drive pulley assembly 32 comprises a spoollike drive pulley having upper and lower flange portions 40 and 42. The peripheries of the flange portions 40 and 42, which present axially spaced cylindrical faces 43, are formed with a plurality of circumferentially spaced tooth recesses 44, and the outboard sides of the flange portions are formed with a plurality of slots 46 that correspond in number and location to the tooth recesses 44. Guide blocks 48 are suitably secured by screws 50 in the slots 46, and, at their outer ends, project radially across the tooth recesses 44. The drive pulley assembly 32 is secured to a vertical drive shaft 52 which is journaled in bearing assemblies mounted in the main frame 30.

As shown in FIGS. 2 and 3, the idler pulley assembly 34 comprises a spoollike idler pulley having upper and lower flange portions 54 and 56 to which are secured guide rings 58. The outer peripheries of the guide rings 58 present axially spaced cylindrical faces 59 and are formed with a plurality of circumferentially spaced tooth recesses 60. The idler pulley assembly 34 is secured to a vertical idler shaft 62 journaled in bearing assemblies mounted in the yoke member 31.

Trained about the drive and idler pulley assemblies 32 and 34, as previously noted, is the timing belt assembly 36. As shown in FIGS. 2, 3 and 4, the timing belt assembly 36 comprises a pair of spaced apart horizontal endless flexible steel tapes 64 of narrow width interconnected by a plurality of equidistantly spaced parallel pin members 66. The tapes 64 are engageable with the cylindrical drive and idler pulley faces 43 and 59, while the end portions of the pin members 66, which serve as tooth elements, have meshing engagement with the drive pulley tooth recesses 44 whereby a positive driving connection is established between the drive pulley assembly and the timing belt assembly. Moreover, in accordance with the present invention, the cylindrical idler pulley faces 59, like the cylindrical drive pulley faces 43, extend axially the full width of the tapes 64, with the recesses 60 serving to accommodate the end portions of the pin members 66. By reason of full contact of the tapes 64 about the cylindrical idler pulley faces 59, splitting or breakage of the tapes in a longitudinal direction is minimized.

In the foregoing assembly, the effective circumference of the drive pulley assembly 32 is the circumference of the cylindrical faces 43, the effective circumference of the idler pulley assembly 34 is the circumference of the cylindrical faces 59, the effective circumference of the timing belt assembly 36 is the circumference of the inner faces of the tapes 64, and the nominal effective circumference of each of the drive and idler pulley assemblies is one-third the effective circumference of the timing belt assembly.

To compensate for manufacturing variations and to accommodate meshing engagement of the pin members 66 with the drive pulley tooth recesses 44, the recesses 44 are formed slightly wider—in the order of 0.015 inches wider—than the diameter of the pins 66, along the arcuate line of contact therebetween when interengaged. In connection with movement of the timing belt assembly 36 about the drive pulley assembly 32, interference tends to occur at the point where each pin member 66 enters a recess 44, and such interference is affected by tension in the tapes 64. An appreciation of the problem of interference can be gained from a consideration of FIGS. 5 and 6 wherein the sizes of the drive pulley tooth recesses 44, relative to the other components shown, are exaggerated for clarity of illustration.

The drive pulley assembly 32' of FIGS. 5 is slightly undersize—that is, the effective circumference of the drive pulley assembly is slightly less than one-third the effective circumference of the timing belt assembly 36. In this situation, the distance between the drive pulley recesses 44 is less than the distance between the pin members 66. With the pin member *66d* in contact with the trailing side of the recess *44d*, the pin members *66a*, *66b* and *66c* are free in the recesses *44a*, *44b* and *44c* respectively. If the assembly 32' is now rotated counterclockwise, the pin member *66e* initially engages the trailing edge of the recess *44e* (as shown in dotted lines), and interference to interengagement thus occurs. Moreover, any tension in the tape 64 will operate to pull the pin member *66e* against the trailing edge of the recess *44e* thereby increasing the extent of interference, and the greater the tension in the belt the more aggravated the interference problem becomes. Under severe conditions of interference, the pin member *66e* will not fully engage in the recess *44e* , the tape 64 will be held away from the cylindrical drive pulley face 43' and the tape will bend over the end of the pin *66e*. The result is tape breakage which is obviously undesirable.

To obviate the aforenoted interference problem, the drive pulley assembly 32 of the present invention is made slightly oversize—that is, the effective circumference of the drive pulley assembly is slightly greater than one-third the effective circumference of the timing belt assembly 36. In this arrangement, as shown in FIG. 6, the distance between the drive pulley recesses 44 or the tooth recess pitch is greater than the distance between the pin members 66 or the tooth element pitch. With the pin member *66a* in contact with the trailing side of the recess *44a*, the pin members *66b*, *66c* and *66d* are free in the recesses *44b*, *44c* and *44d* respectively. If the assembly 32 is now rotated counterclockwise, the pin member *66e* will tend to initially engage the leading edge of the recess *44e* (as shown in dotted lines). However, the friction imposed on the belt 36 by the tape guides 68 and 84 imposes a slight drag on the belt in a direction opposite to the direction of rotation of the pulley assembly 32, and the low coefficient of friction between the pulley 32 and the tapes 64 causes the pin member *66e* to slide over the leading edge into the recess *44e*. During the process of interengagement, any tension in the tape 64 will assist movement of the pin *66e* into the recess *44e*. In accordance with the principle of the present invention, the effective circumference of the drive pulley assembly 32 is in the range of up to 0.005 inches greater than one-third the effective circumference of the timing belt assembly 36. Correspondingly, to minimize interference between the pin members 66 and the idler pulley tooth recesses 60 during interengagement thereof, the idler pulley assembly 34 is made slightly undersize—that is, the effective circumference of the idler pulley assembly is slightly less (in the range of up to 0.007 inches less) than one-third the effective circumference of the timing belt assembly 36.

To maintain the timing belt assembly 36 in a straightline path for accurate resolution of copy during scanning thereof, a pair of tape guide means 68 are provided on the scanning side of the main frame 30 intermediate of the drive and idler pulley assemblies 32 and 34. Each tape guide means 68 may, for example, comprise a laterally inwardly spring biased longitudinal flat strip 70 which overlies and engages portions of the outer edges of the tapes 64 for maintaining the latter flat against adjacent guide strips or surfaces provided on the main frame 30.

For precision operation of the scanner assembly 20, it is desirable that the timing belt assembly 36 be placed under a slight, but not excessive, tension. In accordance with the present invention, biasing means, indicated generally at 72, is arranged on the side of the main frame 30, opposite the tape guide means 68, for imposing a lateral force on the timing belt assembly. More particularly, the force imposing biasing means 72, as shown in FIGS. 2, 4 and 7, comprises a generally C-shaped carrier member 74 having upwardly and downwardly projecting flanges 76 and 78 slidably mounted on upper and lower pairs of horizontal pin members 80 and 82 supported in the main frame 30. Secured along the outer faces of the carrier flanges 76 and 78 are wear strips 84 portions of which are engageable with the inner faces of the timing belt tapes 64. Spring means, in the form of coil springs 86 are disposed about the pin members 80 and 82 intermediate of the main frame 30 and the carrier flanges 76 and 78. The springs 86 bias the carrier member 74 and wear strips 84 laterally outwardly thereby imposing a force on the timing belt assembly under substantially constant tension.

In normal manufacturing procedures, the main frame 30 and yoke member 31 are fabricated of a lightweight metal such as aluminum, while the tapes 64 are fabricated of steel. Aluminum has a higher coefficient of expansion than steel, and under certain conditions the frame means expands relative to the timing belt assembly 36. In this connection, the force imposing biasing means 72 not only serves to preload slightly the timing belt assembly and to maintain the same under substantially constant tension, but at the same time accommodates relative expansion of the frame means. Thus, excessive loading, and resultant breakage, of the timing belt assembly, which might otherwise result from expansion of the frame means, are prevented. When the scanner assembly 20 incorporates means for maintaining the timing belt assembly 36 under substantially constant tension, it is not absolutely essential that the cylindrical idler pulley faces 59 extend axially the full width of the tapes 64, and, in the interests of economy of fabrication and assembly, the width of the faces 59 may be decreased and the tooth recesses 60 correspondingly eliminated.

Supported by and moved with the timing belt assembly 36 are the combined scanner and printer contact units 38, three of which are incorporated in the specific scanner assembly herein disclosed. Each scanner and printer contact unit 38 includes a lower optical scanner carriage assembly 88 mounted on two of the pin members 66, and an upwardly extending carriage and contact assembly 90. The scanner carriage assembly 88 comprises a scanner carriage 92 which carries an optical scanner unit 94 comprised of an elongated hollow lens holder 96 (FIG. 4). Mounted within the lens holder 96 are suitable lens and diaphragm means, and secured to the rear end of the lens holder is a photocell holder 98. Secured at the front end of the lens holder 96 is a lampholder 100 supporting lamp bulbs 102 which serve as a scanning light source means.

Mounted at the upper end of the carriage and contact assembly 90 is a printer contact assembly 104 comprised of an elongated strip or leaf spring member 106 and a contact element 108 in the form of a cylindrical pin member. As shown in FIG. 2, the combined scanner and printer contact units 38 are adapted to be connected to the other electrical components of the transceiver 10 by means of a ribbon tape 110 and a rotor assembly 112. The rotor assembly 112 includes a commutator assembly 114 (FIG. 3) and is adapted to be driven from the drive shaft 52 by means of a belt 116. A motor 118 (FIG. 1) is arranged to drive a gear 120 at the lower end of the drive shaft 52.

When the gear 120 is rotated, the pulley assemblies 32 and 34 and the timing belt assembly 36 are correspondingly rotated, and the optical scanner carriage assemblies 88 are accordingly moved in a continuous closed path, a portion of which extends parallel to the copy feed roller 22. As copy material is drawn about the copy feed roller 22, it is scanned, line-by-line, an elemental area at a time. The images received by the optical scanners 94 from the copy material are converted to electrical signals through suitable circuitry, and these signals are sent to another transceiver or suitable recording device for reproduction of the original copy material. For further details concerning the general construction and operation of the various components of the copy feed mechanism 18, and of the optical scanner assembly 20 in which the drive and idler pulley assemblies 32 and 34 and the force-imposing means 72 of the present invention are incorporated, reference may be had to the aforesaid copending application of Frans Brouwer and Frank L. Sobchak.

In the receiving mode of the facsimile transceiver 10, electrical signals received from another transmitter are converted to printing current by suitable circuitry, and this current is used to produce an image of the transmitted copy on electrolytic recording paper. As shown in FIG. 1, the printout mechanism comprises a transverse power driven combined drive and heat roller assembly 122 and an associated pressure roller 124 which together serve to withdraw moist electrolytic recording paper from a roll 126 past a printer bar 128, and issue the paper with reproduced data for viewing.

Arranged for cooperation with the printer bar 128 are the above-described printer contact assemblies 104. The printer bar 128 is disposed vertically above and in the straight line path of travel of the scanner and printer contact units 38 along one side of the scanner assembly 20. In the receiving mode, the printer bar 128 is biased downwardly and presses the paper from roll 126 downwardly into contact with the printer contact element 108 of the adjacent printer contact unit 38. As the timing belt assembly 36 is rotated, the printer contact units 38 are moved in the aforementioned closed path and the printer contact elements 108 are successively moved lengthwise of the printer bar 128. Printing current is passed through the associated printer contact elements 108, the recording paper, and the printer bar 128, and iron from the printer bar 128 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 122, it is dried and the electrolytic printing process is completed. Further details of the construction and operation of the various components of the printout mechanism associated with the printer contact assemblies 104 are disclosed in the aforesaid copending application of Frans Brouwer and Frank L. Sobchak.

While there has been shown and described a preferred embodiment of the present invention, it will be understood by those skilled in the art that various rearrangements and modifications may be made therein without departing from the spirit and scope of the invention.

We claim:

1. An optical scanner assembly comprising frame means, a drive pulley assembly rotatably mounted in said frame means and having circumferentially spaced exterior tooth recesses and cylindrical face means, a motor in driving connection with said drive pulley assembly, a substantially free running idler pulley assembly rotatably mounted in said frame means and having cylindrical face means, a timing belt assembly including endless flexible nonstretchable tape means trained about said cylindrical face means of said drive and idler pulley assemblies in low friction engagement therewith and a plurality of tooth elements meshing with said tooth recesses of said drive pulley assembly, the axes of rotation of said pulley assemblies being parallel and separated by a distance equal to one-third the circumference of the inner face of said tape means, three circumferentially space optical scanner assemblies carried by said timing belt assembly for movement therewith in a continuous closed path upon rotation of said drive pulley assembly, said cylindrical face means of said drive pulley assembly having a circumference slightly greater than one-third the circumference of the inner face of said tape means to provide a tooth recess pitch slightly greater than the pitch of said tooth elements and said recesses having a width slightly greater than the width of said tooth elements by an amount sufficient to accommodate for slippage of said tape means with respect to said drive pulley cylindrical face means while in engagement therewith.

2. The optical scanner assembly of claim 1 including resilient biasing means mounted on said frame means and imposing a lateral force on said endless flexible tape means for maintaining said timing belt assembly under substantially constant tension.

3. The optical scanner assembly of claim 1 wherein said cylindrical face means of said idler pulley assembly has circumferentially spaced exterior tooth recesses and wherein said idler pulley assembly has a circumference slightly less than one-third the circumference of the inner face of said tape means to provide an idler tooth recess pitch slightly smaller than the pitch of said tooth elements and said idler tooth recesses have a width slightly greater than the width of said tooth elements by an amount sufficient to accommodate for slippage between said tape means and said idler pulley cylindrical face means while in engagement therewith.

4. The optical scanner assembly of claim 3 wherein the circumference of said cylindrical face means of said drive pulley assembly is up to 0.005 inches greater than one-third the circumference of the inner face of said tape means, and said circumference of said cylindrical face means of said idler pulley assembly is up to 0.007 inches less than one-third the circumference of the inner face of said tape means.

5. The optical scanner assembly of claim 3 wherein said endless flexible tape means is comprised of a pair of spaced apart endless flexible tapes of narrow width, said tooth elements are comprised of pin members extending between and secured at their end portions to said tapes, and said cylindrical face means of each of said drive and idler pulley assemblies is comprised of a pair of axially spaced cylindrical faces engageable with said tapes.

6. The optical scanner assembly of claim 5 wherein said cylindrical faces of said idler pulley assembly have an axial extent at least equal to the width of said tapes, and are provided with circumferentially spaced exterior tooth recesses for accommodating the end portions of said pin members.

7. The optical scanner assembly of claim 5 including wear strips engageable with the inner faces of said tapes, means mounting said wear strips on said frame means intermediate of said drive and idler pulley assemblies, and means biasing said wear strips laterally outwardly thereby imposing a force on said tapes for maintaining said timing belt assembly under substantially constant tension.

8. An optical scanner assembly comprising frame means, a drive pulley assembly rotatably mounted in said frame means and having circumferentially spaced exterior tooth recesses and cylindrical face means, a motor in driving connection with said drive pulley assembly, a substantially free running idler pulley assembly rotatably mounted in said frame means and having cylindrical face means, a timing belt assembly including endless flexible nonstretchable tape means trained about said cylindrical face means of said drive and idler pulley assemblies in low friction engagement therewith and a plurality of tooth elements meshing with said tooth recesses of said drive pulley assembly, and at least one optical scanner assembly carried by said timing belt assembly for movement therewith in a continuous closed path upon rotation of said drive pulley assembly, the pitch of said drive pulley tooth recesses being slightly greater than the pitch of said tooth elements and said tooth recesses having a width slightly greater than the width of said tooth elements by an amount sufficient to accommodate for slippage of said tape means with respect to said drive pulley cylindrical face means while in engagement therewith.

9. The optical scanner assembly of claim 8 wherein said cylindrical face means of said idler pulley assembly has circumferentially spaced exterior tooth recesses having a pitch slightly less than the pitch of said tooth recesses and the width of said recesses is slightly greater than the width of said tooth elements to accommodate for slippage between said tape means and said idler pulley cylindrical face means.

10. The optical scanner assembly of claim 9 wherein said endless flexible tape means is comprised of a pair of spaced apart endless flexible tapes of narrow width, said tooth elements are comprised of pin members extending between and secured at their end portions to said tapes, and said cylindrical face means of each of said drive and idler pulley assemblies is comprised of a pair of axially spaced cylindrical faces engageable with said tapes.

11. The optical scanner assembly of claim 10 wherein said cylindrical faces of said idler pulley assembly have an axial extent at least equal to the width of said tapes, and are provided with circumferentially spaced exterior tooth recesses for accommodating the end portions of said pin members.

12. The optical scanner assembly of claim 10 including wear strips engageable with the inner faces of said tapes, means mounting said wear strips on said frame means intermediate of said drive and idler pulley assemblies, and means biasing said wear strips laterally outwardly thereby imposing a force on said tapes for maintaining said timing belt assembly under substantially constant tension.

13. The optical scanner assembly of claim 8 including resilient biasing means mounted on said frame means and imposing a lateral force on said endless flexible tape means for maintaining said timing belt assembly under substantially constant tension.

14. A facsimile scanner assembly comprising frame means, a drive pulley assembly mounted in said frame means and having low friction cylindrical face means, a motor in driving connection with said drive pulley assembly, a substantially free-running idler pulley rotatably mounted in said frame means and having cylindrical face means, a timing belt assembly including endless flexible nonstretchable tape means trained about said cylindrical face means, and at least one facsimile scanner assembly carried by said timing belt assembly for movement therewith in a continuous closed path upon operation of said motor, said drive pulley and said timing belt assemblies having interacting means thereon to enable said timing belt assembly to be directly driven by said drive pulley assembly, said interacting means comprising tooth elements on one of said assemblies and tooth recesses on the other, the pitch of the interacting means on said drive pulley assembly being slightly greater than the pitch of the interacting means on said timing belt assembly, and said tooth recesses having a width greater than the width of said tooth elements at least by an amount sufficient to accommodate for slippage of said tape means with respect to said drive pulley assembly.